(12) United States Patent
Jordan

(10) Patent No.: US 10,588,425 B1
(45) Date of Patent: Mar. 17, 2020

(54) CHILD SEAT SYSTEM

(71) Applicant: Angelica Jordan, Dorchester, MA (US)

(72) Inventor: Angelica Jordan, Dorchester, MA (US)

( * ) Notice: Subject to any disclaimer, the term of this patent is extended or adjusted under 35 U.S.C. 154(b) by 0 days.

(21) Appl. No.: 16/004,012

(22) Filed: Jun. 8, 2018

(51) Int. Cl.
| | |
|---|---|
| *A47B 83/02* | (2006.01) |
| *A47D 1/10* | (2006.01) |
| *A47C 7/66* | (2006.01) |
| *A47C 13/00* | (2006.01) |
| *A47D 1/04* | (2006.01) |
| *A47D 15/00* | (2006.01) |
| *B60N 2/28* | (2006.01) |
| *A47D 1/00* | (2006.01) |
| *B62B 7/12* | (2006.01) |
| *A47G 21/06* | (2006.01) |
| *A47D 13/06* | (2006.01) |
| *B62B 7/00* | (2006.01) |

(52) U.S. Cl.
CPC ............. *A47D 1/04* (2013.01); *A47D 1/0081* (2017.05); *A47D 1/0085* (2017.05); *A47D 13/06* (2013.01); *A47D 15/00* (2013.01); *A47D 15/006* (2013.01); *A47G 21/06* (2013.01); *B60N 2/2806* (2013.01); *B60N 2/2812* (2013.01); *B60N 2/2866* (2013.01); *B62B 7/006* (2013.01); *B62B 7/12* (2013.01)

(58) Field of Classification Search
CPC ...... A47D 1/04; A47D 1/0081; A47D 1/0085; A47D 13/06; A47D 15/00; A47D 15/06; B60N 2/2806; B60N 2/2812; B60N 2/2866

USPC ........ 297/118, 129, 130, 134, 150, 154, 153, 297/155
See application file for complete search history.

(56) References Cited

U.S. PATENT DOCUMENTS

| | | | | | |
|---|---|---|---|---|---|
| 2,207,923 | A | * | 7/1940 | Kelso ..................... | A47C 12/02 108/99 |
| 2,230,015 | A | * | 1/1941 | Rich ....................... | E06C 1/387 182/161 |
| 2,704,116 | A | * | 3/1955 | Scanlon ................. | A47D 1/103 297/150 |
| 2,799,324 | A | * | 7/1957 | Anderson .............. | A47D 1/008 297/145 |
| 2,900,011 | A | * | 8/1959 | Casey .................... | A47C 12/02 297/155 X |
| 2,952,301 | A | * | 9/1960 | Schlaak ................. | A47C 12/02 182/106 |
| 2,979,118 | A | * | 4/1961 | Gelman ................. | A47D 1/008 297/150 |
| 3,059,722 | A | * | 10/1962 | Rouse .................... | A47C 12/02 182/156 |
| 3,368,842 | A | * | 2/1968 | Polsky .................... | A47C 7/70 297/150 |
| 4,119,175 | A | * | 10/1978 | Herwynen ............. | E06C 1/393 182/125 |

(Continued)

*Primary Examiner* — Rodney B White
(74) *Attorney, Agent, or Firm* — Cramer Patent & Design, PLLC; Aaron R. Cramer

(57) ABSTRACT

A child seat system which provides adaptable portions capable of being configured in different forms including a car seat, a highchair, a climbing apparatus, and a stroller. The system includes removably attachable major components including a seat assembly, a highchair base assembly, and a stroller base assembly. The system is envisioned to include a number of entertaining and educational features for an occupant such as audio video accessories, a cup holder, and a mirror.

20 Claims, 12 Drawing Sheets

(56) References Cited

U.S. PATENT DOCUMENTS

| | | | | |
|---|---|---|---|---|
| 4,320,817 A * | 3/1982 | Knoke | A47C 12/02 | 182/126 |
| 4,946,180 A * | 8/1990 | Baer | A47D 1/008 | 297/155 X |
| 5,133,567 A * | 7/1992 | Owens | B62B 7/12 | 16/445 |
| 5,230,523 A * | 7/1993 | Wilhelm | B62B 7/12 | 297/250.1 X |
| 5,360,221 A * | 11/1994 | Chai | B60N 2/2839 | 280/30 |
| 5,722,507 A * | 3/1998 | Kain | E06C 1/393 | 182/104 |
| 5,806,922 A * | 9/1998 | Mendelovich | A47D 1/004 | 297/130 |
| 5,829,826 A * | 11/1998 | Ziccardi | A47D 1/06 | 297/118 |
| 5,845,724 A | 12/1998 | Barrett | | |
| 5,873,425 A | 2/1999 | Yang | | |
| 5,893,606 A * | 4/1999 | Chiang | A47D 1/004 | 297/148 X |
| 5,937,961 A | 8/1999 | Davidson | | |
| 6,000,750 A * | 12/1999 | Rossman | A47D 1/004 | 297/118 X |
| 6,017,088 A * | 1/2000 | Stephens | A47D 13/02 | 297/130 X |
| 6,148,942 A | 11/2000 | Mackert, Sr. | | |
| 6,427,805 B1 * | 8/2002 | Gibson | E06C 1/387 | 182/165 |
| 6,443,261 B1 * | 9/2002 | Gibson | E06C 1/16 | 182/104 |
| 6,450,290 B1 * | 9/2002 | Spak | E06C 1/387 | 182/156 |
| 6,536,557 B2 * | 3/2003 | Gibson | E06C 1/393 | 182/129 |
| 6,773,064 B2 * | 8/2004 | Treen | A47D 1/002 | 297/153 X |
| 6,832,813 B2 * | 12/2004 | Tomas | A47D 1/002 | 297/250.1 |
| 6,902,035 B2 * | 6/2005 | Baumgartner | E06C 1/393 | 182/165 |
| 7,004,272 B1 | 2/2006 | Brown et al. | | |
| 7,104,603 B2 * | 9/2006 | Keegan | A47D 1/004 | 297/151 X |
| 7,128,187 B2 * | 10/2006 | Simpson | E06C 1/387 | 182/129 |
| 7,182,176 B2 * | 2/2007 | Gibson | A47C 12/00 | 182/129 |
| 7,334,836 B2 * | 2/2008 | Chen | A47D 1/023 | 297/150 X |
| 7,490,684 B2 | 2/2009 | Seymour et al. | | |
| 7,673,934 B2 * | 3/2010 | Bearup | A47D 1/002 | 297/130 |
| 7,673,940 B2 * | 3/2010 | Fritz | A47D 1/004 | 297/250.1 |
| 7,695,060 B2 * | 4/2010 | Dubiel | A47D 1/008 | 297/148 |
| 7,828,117 B2 * | 11/2010 | Cole | A47C 12/02 | 182/165 |
| 7,918,497 B2 * | 4/2011 | Keegan | A47D 1/008 | 297/130 |
| 7,922,244 B2 * | 4/2011 | Bearup | A47D 1/002 | 297/153 |
| 7,931,123 B2 * | 4/2011 | Moldthan | E06C 1/387 | 182/129 |
| 7,967,111 B2 * | 6/2011 | Meyers | E06C 1/387 | 182/129 |
| 7,984,790 B2 * | 7/2011 | Meyers | A47C 12/00 | 182/129 |
| 8,033,348 B1 | 10/2011 | Parkhe | | |
| 8,162,390 B2 * | 4/2012 | Zhong | A47D 1/103 | 297/130 |
| 8,308,230 B2 * | 11/2012 | Zhong | A47D 1/103 | 297/148 |
| 8,388,063 B2 * | 3/2013 | Fiore, Jr. | A47D 1/004 | 297/256.11 |
| 8,864,166 B2 * | 10/2014 | Longenecker | B60N 2/2806 | 297/130 X |
| 9,554,657 B2 * | 1/2017 | Taylor | A47D 1/0081 | |
| 9,635,955 B2 * | 5/2017 | Greger | A47D 1/023 | |
| 9,986,850 B2 * | 6/2018 | Haut | A47D 1/0081 | |
| 2002/0074835 A1 * | 6/2002 | Chalender | A47C 13/00 | 297/118 |
| 2007/0056797 A1 * | 3/2007 | Wang | B62B 1/12 | 182/21 |
| 2010/0019547 A1 * | 1/2010 | Gray | B60N 2/2821 | 297/118 |
| 2012/0086240 A1 * | 4/2012 | Tsai | A47D 1/00 | 297/130 |
| 2015/0296985 A1 * | 10/2015 | Alexander | A47D 1/002 | 297/354.12 |

\* cited by examiner

CHILD SEAT SYSTEM

RELATED APPLICATIONS

Not applicable.

FIELD OF THE INVENTION

The present invention relates generally to a child seat system which provides adaptable portions capable of being configured in different forms.

BACKGROUND OF THE INVENTION

Carrying an infant for a long period of time can be quite fatiguing. To alleviate the problem of fatigue, strollers have been used as an auxiliary conveyance vehicle for infants for some time. Conventional baby strollers have been known and used for many years. A stroller is a four-wheeled or three-wheeled folding carriage designed as a chair in which an infant may be manually pushed. When the child who is to be transported in the stroller is an infant, the stroller is relatively easy to push. However, even in today's day and age, manually pushing a stroller can be tiresome and inconvenient.

Many of the strollers in use today lack the necessary and essential safety protective measures and equipment that will protect the infant. However, as the child grows and gains weight, the stroller becomes increasingly difficult to push. In addition, when the stroller is to be moved up an incline, the person pushing the stroller may have substantial difficulty in traversing the incline. This is especially true when the person pushing the stroller is elderly or has a physical ailment.

Power driven conveyances, such as power-driven wheelchairs are often too inconvenient and cumbersome to use. The necessary drive components have resulted in relatively heavy and awkward constructions. Typically, these power-driven wheelchairs have heavy-duty frames to support all of the equipment. These designs generally result in configurations that are not easily folded or disassembled compactly so that it can be transported in a standard passenger vehicle. This is not desirable. A suitable solution is desirable.

Various attempts have been made to solve problems found in stroller art. Among these are found in: U.S. Pat. Nos. and U.S. Pat. App. Pub. Nos. 2006/0022434; 5,937,961; 6,148,942; and 4,152,005. These prior art references are representative of strollers.

None of the above inventions and patents, taken either singly or in combination, is seen to describe the invention as claimed. Thus, a need exists for a reliable combination child vehicle seat and stroller apparatus, and to avoid the above-mentioned problems.

SUMMARY OF THE INVENTION

The principles of the present invention provide for a A child seat system, comprising a seat assembly removably affixed along a top surface of a highchair base assembly, the seat assembly includes an L-shaped structure having conjoined rectangular seat section and seat back section portions, the seat assembly includes a pivoting tray assembly, child restraining straps, a booster seat, a pair of side inserts, and a pair of vehicle seatbelt apertures. The seat assembly is removed completely from the highchair base assembly by detaching the fasteners, the side inserts are provided for use with infants and are removed during a transitional process for use with older children as they grow and are thus adjustable. The seat assembly provides different sitting heights for differently sized children via a booster seat that adjusts up and down, the booster seat is sized to fit snuggly within a rectangular seat aperture portion formed within a center portion of the seat section. The seat assembly is used in a stand-alone manner as a car seat device by utilizing a shoulder and crotch strap portions and by routing an existing vehicle seatbelt through a pair of seatbelt apertures formed through opposing side portions of the seat assembly. The seat assembly provides a tray assembly which is positioned horizontally across a front area of a child, or pivoted to a vertical side position, the tray assembly is pivotingly affixed to the seat back section, and supported by a tray rest arm on the opposite side, the tray assembly is rotated to a horizontal position where it is to rest upon the stationary tray rest arm, the tray assembly is also rotated to a vertical side position. The tray assembly is retained in its vertical position via a tray latch portion of a tray restraint arm, also stationarily affixed to a side portion of the seat back section;

The highchair base assembly provides a step-ladder-shaped structure having a horizontal highchair platform along a top portion, the highchair platform is envisioned to provide a rigid bottom surface and a padded top surface, the highchair platform also includes a plurality of protruding frame members which extend downwardly to support a ladder frame along a front edge, and a pair of highchair wheels along a rear edge portion of the highchair platform. The rearwardly located wheels enable easy transport of the highchair base assembly across a floor surface. The highchair platform also includes a plurality of protruding frame members which extend downwardly to support a ladder frame along a front edge, and a pair of highchair wheels along a rear edge portion of the highchair platform. The ladder frame includes a plurality of integral horizontal and parallel rungs, acting to provide a climbing activity for the child.

The child seat system may also have a conjoined rectangular seat section and seat back section portions which are made using foam rubber sections with water-proof vinyl coverings. The child seat assembly may be removed completely from the highchair base assembly by detaching the fasteners or the seat assembly is pivoted rearwardly about the hinged hook-and-loop fastener by detaching only the front hook fastener and loop fastener portions to configure the child seat system for the climbing activity. The seat assembly may also be removably affixed to the highchair platform portion along a front edge portion via integral corresponding flat hook fastener and flat loop fastener portions and along a rear edge portion via a hinged hook-and-loop fastener.

The tray assembly may include a first microphone, at least one cup holder, at least one audio speaker, a removable mirror, and a personal electronic device holder, the first microphone. The speaker, and the personal electronic device holder are in electrical and electronic communication with each other to provide a multi-functional audio and video system to entertain and educate the child. The child seat system may also comprise a mirror which slides into the tray assembly, acting as a reflecting mirror when in a vertical position, and as a play or feeding surface when in a horizontal position. A series of four three-hundred sixty-degree rotation pivotable stroller wheels may also be provided for support and manual locomotion in lieu of the pair of highchair wheels and the ladder frame. The child seat system may also comprise an eating utensil set which includes a spoon and fork set, a plate, a cup, and a sippy cup, wherein the spoon and fork set, the plate, the cup, and the sippy cup each have a text-to-speech conversion circuit.

In a separate embodiment, that child seat system may comprise a stroller base assembly which includes an open-top and generally rectangular fabric enclosure supported along upper edges by a tubular frame, a pair of pivoting front stroller wheels, a pair of fixed rear stroller wheels, and an operable pushing handle, the enclosure is made using a flexible waterproof fabric material forming an inner space portion below and in between a pair of seat assemblies. The seat assemblies rotate one hundred eighty degrees so that both seat assemblies are facing one another. The front of each seat assembly is also provided with a release button to aid in release, rotation, and removal of said respective seat assembly. The pushing handle and wheel portions are securely attached to, and supported by the tubular frame, the sunshade is envisioned to help block harmful ultraviolet light and reduce incoming sun light, as well as protecting an occupant from rain, wind, or snow and a plurality of solar photovoltaic panels are positioned upon the sunshade for purposes of capturing rays of the sun to produce electricity. The pushing handle may be made of metal tubular construction and associated with the frame via a handle pivot portion, the pushing handle is pivoting from a rearward to a forward position, thereby allowing the caregiver to motion the stroller embodiment in an opposite direction, allowing a caregiver walking behind the child seat system to guide the child seat system along a ground surface. The inner space includes a removably attachable pedal assembly having pedals and rotating crank portions to provide an exercising means to the seated child or children, by emulating a cycling activity.

The child seat system according to this embodiment may also comprise a pedal assembly which provides a mechanical drive means to the stroller wheels, thereby enabling the child to pedal the child seat system along a surface while being coincidentally motioned by the caregiver using the pushing handle. An attachable pedal assembly may also be provided for both seat assemblies while in a forward-facing position, the forward-facing position is also provided with an outrigger arm and a pivotable wheel to aid in steering of the child seat system. Each of the seat assembles is provided with an attachable mirror to allow the child to see the parent or care provider located near the pushing handle for reassurance and comfort. The forward-facing surface of the stroller base assembly is provided with two headlight assemblies to aid in operation during nighttime hours or other periods of reduced ambient light. The rear facing surface of the stroller base assembly is provided with a centrally located outrigger standing board to permit older children to stand upon during motion of the stroller base assembly. The side facing surfaces of the stroller base assembly are provided with a plurality of decorative icons such as numeric characters, alpha characters, geometric shapes, or figurines and are physically attached by a retractable cable to allow the child to pull on the decorative icons for purposes of play. The upper portion of the pushing handle include a cup holder, a GPS tracking device, and a Wi-Fi hotspot.

The child seat system may also comprise an eating utensil set including a spoon and fork set, a plate, a cup, and a sippy cup, wherein the spoon and fork set, the plate, the cup, and the sippy cup each have a text-to-speech conversion circuit and/or a gear style personal electronic device holder that provides for an audio plug which connects to a GPS tracking device. The child seat system may also comprise a remote-control device provided to allow for remote control over the propulsion features of the stroller base assembly, the remote-control device includes a GPS receiver with a GPS antenna, a GPS notification screen and a navigation computer and/or a car seat base atop a playpen.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
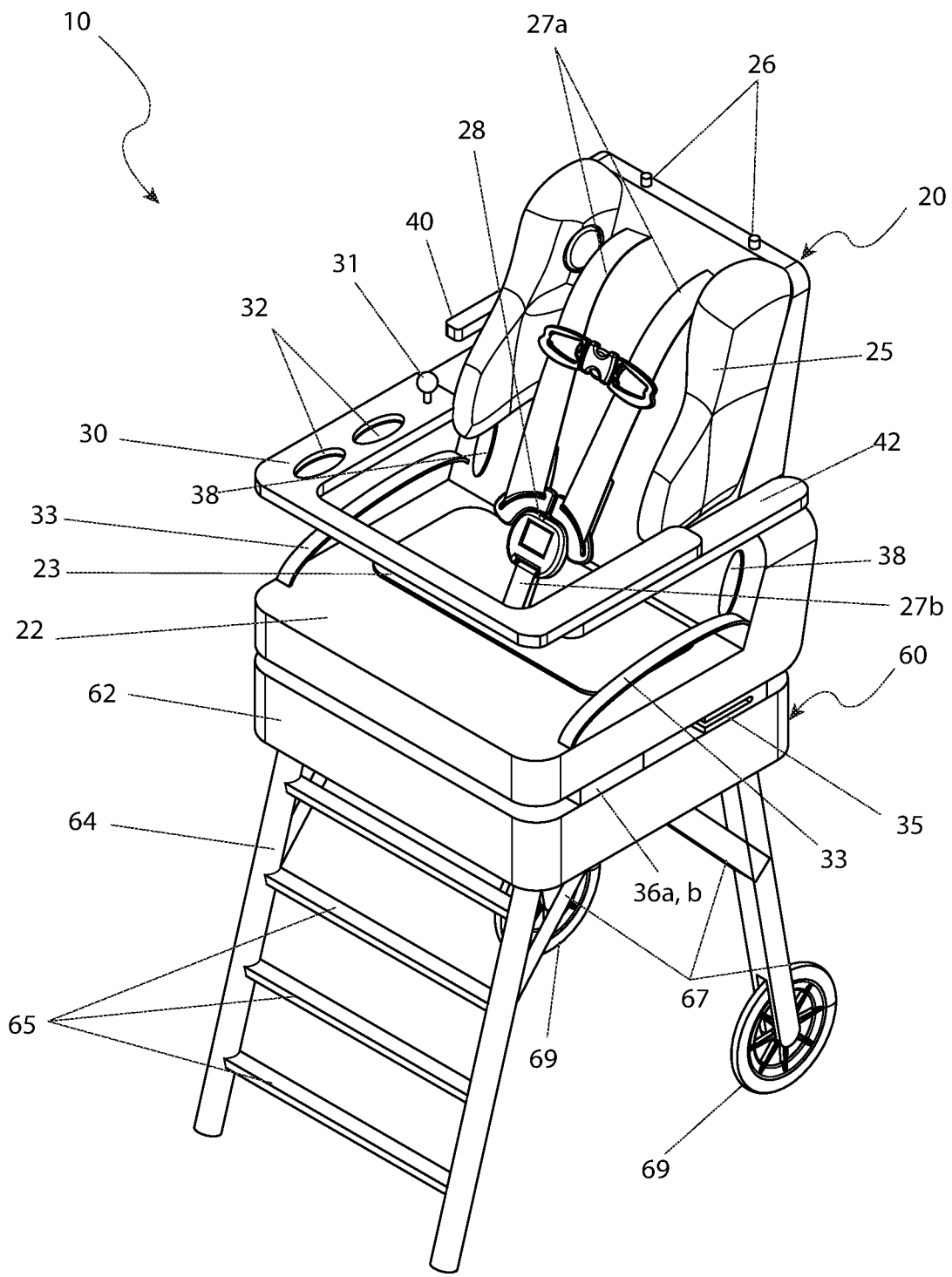
FIG. 1 is a perspective view of a child seat system 10 depicting a highchair configuration, according to a preferred embodiment of the present invention.

DESCRIPTIVE KEY 10 child seat system
20 seat assembly
22 seat section 23 booster seat
24 insert aperture
25 seat back section
26 shade aperture
27a shoulder strap
27b crotch strap
28 buckle
30 tray assembly
31 first microphone
32 cup holder
33 side inserts
35 hinged hook-and-loop fastener
36a hook fastener
36b loop fastener
38 seat belt aperture
40 tray restraint arm
41 tray latch
42 tray rest arm
43 retractable stroller handle
44 sunshade
45 360 degree rotation pivotable stroller wheels
46 post fastener
48 speaker
50 mirror
51 padded infant insert
52 climbing path
60 highchair base assembly
62 highchair platform
64 ladder frame
65 rung
67 frame members
69 highchair wheel
70 gear style personal electronic device holder
71 cavity
72 mounting clip
75 personal electronic device
80 ramp
100 stroller embodiment
110 stroller base assembly
112 enclosure
114 inner space
116 tubular frame
118 pushing handle
119 handle pivot
121 front stroller wheel
123 rear stroller wheel
130 pedal assembly
132 crank
134 pedal
136 mounting bracket
200 eating utensil set
205 remote control device
210 outrigger arm
215 pivotable wheel
220 headlight assemblies
225 outrigger standing board
230 release button
235 decorative icons
240 cup holder
245 GPS tracking device
250 Wi-Fi hotspot
300 playpen embodiment
305 travel path "t"
310 open play space
315 drive mechanism enclosure
320 spoon and fork set
325 plate
330 cup
335 sippy cup
340 text-to-speech conversion circuit
400 solar photovoltaic panels
405 charge controller
410 rechargeable battery bank
415 ON/OFF switch
420 overcurrent protective device
425 main controller
430 drive motors
435 speech control circuit
440 speech speaker
445 speech receiver
450 GPS receiver
455 WIFI transceiver circuitry
460 backhaul transmitter
500 GPS antenna
505 GPS notification screen
510 navigation computer
515 WIFI antenna
520 speed controller
525 gear selection controller
600 double sided trampoline
605 steering wheel
610 3D driving monitor
615 seat snap-in clips
620 oval storage compartment
625 square storage compartment
630 zipper
635 activity play mat
640 auxiliary support wheels
645 support chains
650 attachment clamps
655 speaker strips
700 audio plug
705 second microphone
710 tablet holder
715 car seat base
720 adjustable handles

DETAILED DESCRIPTION OF THE
PREFERRED EMBODIMENT

The best mode for carrying out the invention is presented in terms of its preferred embodiment, herein depicted within FIGS. 1 through 12. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a child seat system (herein described as the "system") 10, which provides adaptable portions capable of being configured in different forms including a car seat 20, a highchair 10, a climbing apparatus, a playpen, and a stroller 100. The system 10 includes removably attachable major components including at least one (1) seat assembly 20, a highchair base assembly 60, and a stroller base assembly 110.

It is envisioned that the system 10 would be made available with varying external coverings, decorations, themes, logos, colors, and patterns, based upon a user's preferences.

Referring now to FIG. 1, a perspective view of the system 10 depicting a highchair configuration, according to a preferred embodiment of the present invention, is disclosed. In the embodiment of the system 10 shown here, a seat assembly 20 is removably affixed along a top surface of a highchair base assembly 60 to provide a highchair apparatus.

The seat assembly 20 includes an "L"-shaped structure having conjoined rectangular seat section 22 and seat back section 25 portions made using foam rubber sections with water-proof vinyl coverings. The seat assembly 20 is envisioned to also provide embellishments including a pivoting tray assembly 30, child restraining straps 27a, 27b, a booster seat 23, a pair of side inserts 33, and a pair of vehicle seatbelt apertures 38 (also see FIGS. 2 and 3).

The highchair base assembly 60 provides a step-ladder-shaped structure having a horizontal highchair platform 62 along a top portion. The highchair platform 62 is envisioned to provide a rigid bottom surface and a padded top surface. The highchair platform 62 also includes a plurality of protruding frame members 67 which extend downwardly to support a ladder frame 64 along a front edge, and a pair of highchair wheels 69 along a rear edge portion of the highchair platform 62. The ladder frame 64 includes a plurality of integral horizontal and parallel rungs 65, thereby acting to provide a climbing activity for the child (see FIG. 4). The rearwardly located wheels 69 enable easy transport of the highchair base assembly 60 across a floor surface. The side inserts 33 are provided for use with infants and may be removed during a transitional process for use with older children as they grow via a fastening method (not shown) and are thus adjustable.

The seat assembly 20 is to be removably affixed to the highchair platform portion 62 along a front edge portion via integral corresponding flat hook fastener 36a and flat loop fastener 36b portions, and along a rear edge portion via a hinged hook-and-loop fastener 35. It is envisioned that the seat assembly 20 may be removed completely from the highchair base assembly 60 by detaching the fasteners 35, 36a, 36b, or the seat assembly 20 may be pivoted rearwardly about the hinged hook-and-loop fastener 35 by detaching only the front hook fastener 36a and loop fastener 36b portions to configure the system 10 for a climbing activity (see FIG. 4).

Figure 2:
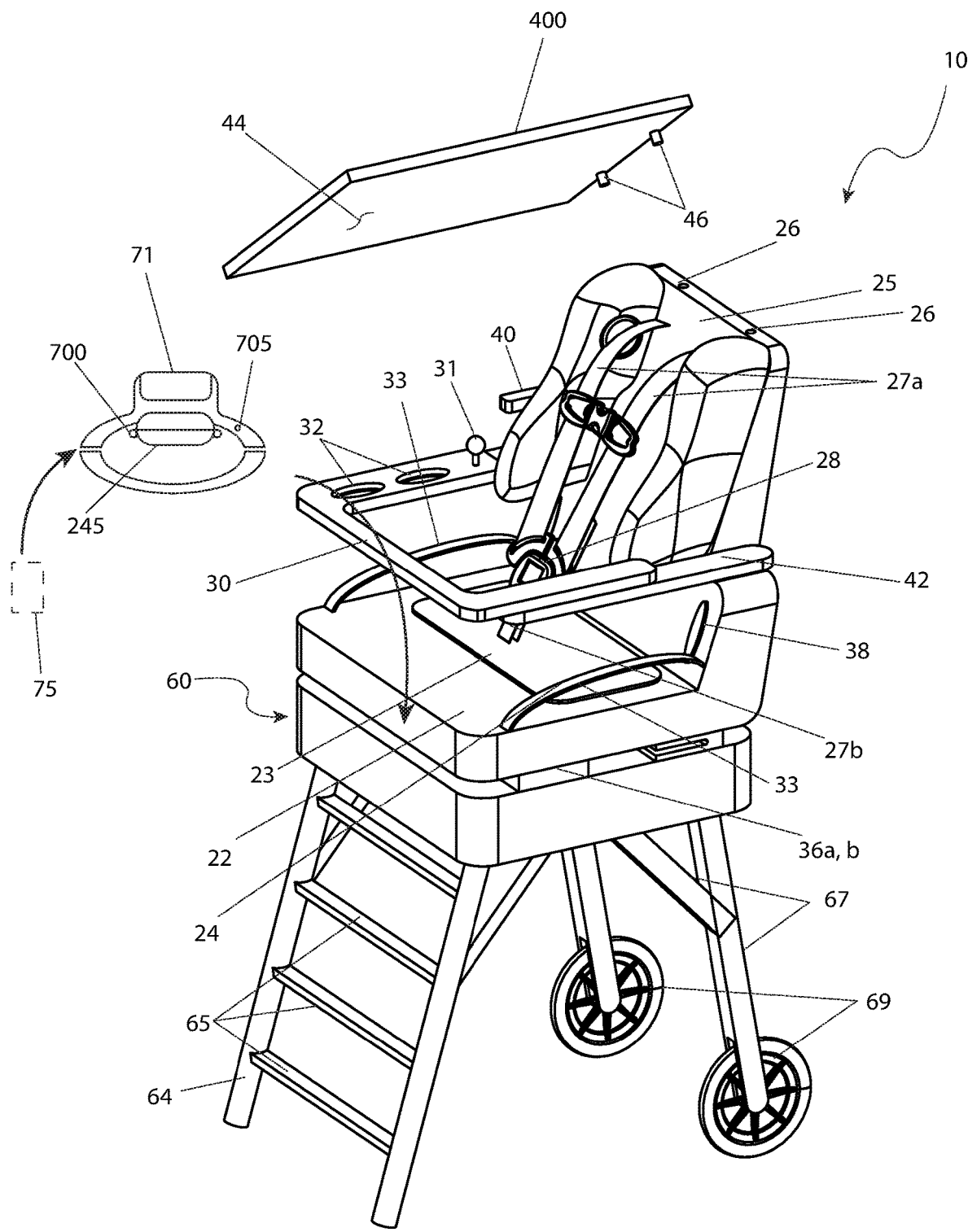
FIG. 2 is another perspective view of the child seat system 10, depicting the highchair configuration according to a preferred embodiment of the present invention.
Figure 3:
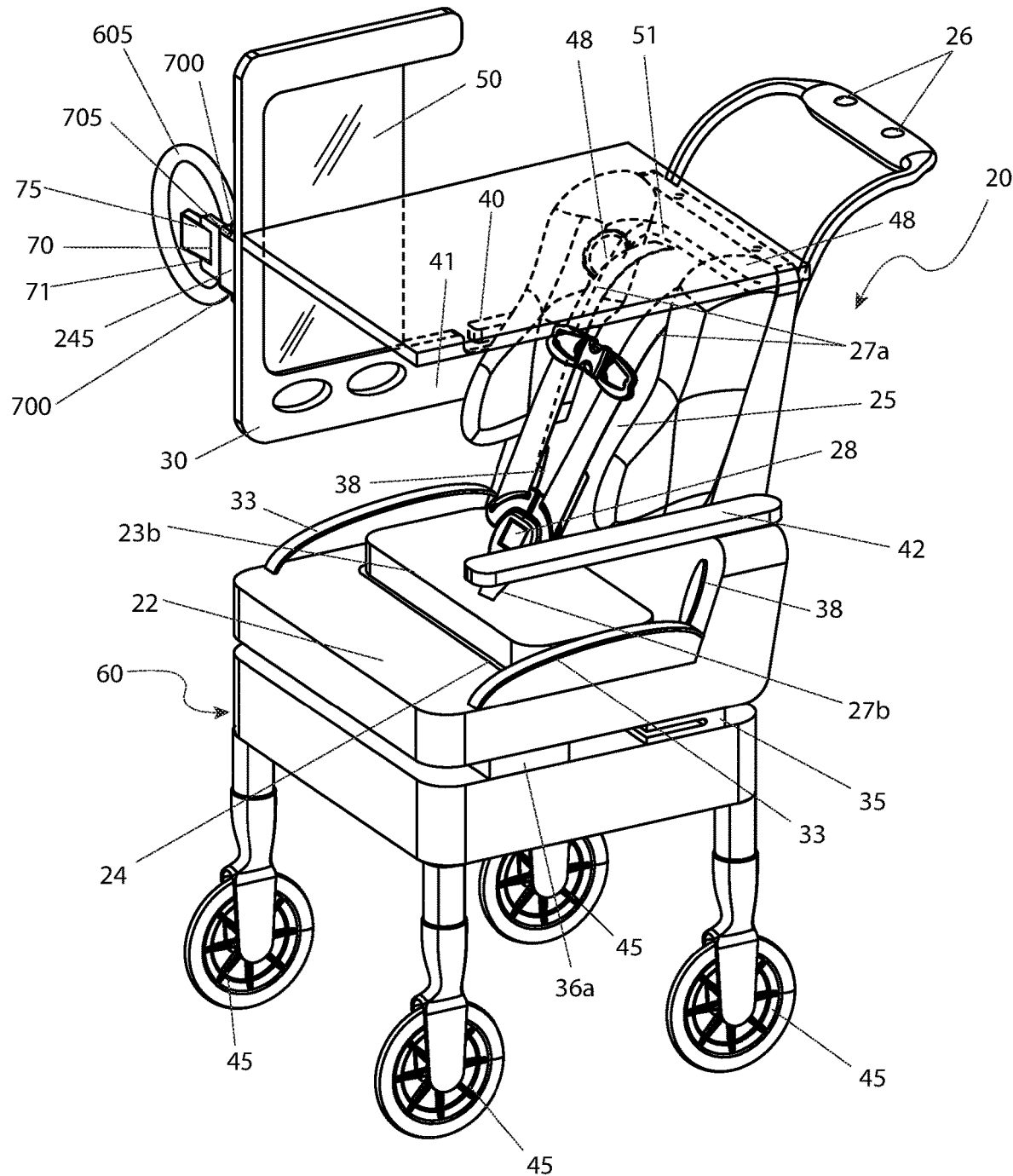
FIG. 3 is yet another perspective view of the seat assembly 20, depicting a stroller configuration according to a one embodiment of the present invention.

Referring now to FIGS. 2 and 3, perspective views of the seat assembly 20, according to a preferred embodiment of the present invention, are disclosed. FIGS. 2 and 3 depict a high chair and a stroller configuration respectively, each utilizing the base seat assembly 20. The seat assembly 20 provides a child restraining means including a pair of fabric shoulder straps 27a and a crotch strap 27b. One (1) end of each shoulder strap 27a is permanently attached to the seat back section 25, and the crotch strap 27b is permanently affixed to the seat section 22. The free end portions of the shoulder straps 27a are joined adjacent to an occupying child's chest area to the crotch strap 27b via a buckle 28. The seat assembly 20 provides different sifting heights for differently sized children via a booster seat 23 that adjusts up and down to hold the infant as they grow up. The booster seat 23 is sized to fit snuggly within a rectangular seat aperture portion 24 formed within a center portion of the seat section 22. The booster seat 23 is envisioned to be made using similar materials and construction as the seat 22 and seat back 25 sections. As aforementioned described, side inserts 33 are provided for use with infants and may be removed during a transitional process for use with older children as they grow via a fastening method (not shown) and are thus adjustable.

The seat assembly 20 may be used in a stand-alone manner as a car seat device by utilizing the shoulder 27a and crotch strap 27b portions and by routing an existing vehicle seatbelt through a pair of seatbelt apertures 38 being formed through opposing side portions of the seat assembly 20. Additionally, the seat assembly 20 may be used in conjunction with the previously described highchair base assembly 60 and a stroller base assembly 110 (see FIGS. 2 and 5), to provide respective highchair and stroller apparatuses.

The seat assembly 20 also provides a tray assembly 30 which may be positioned horizontally across a front area of the child, or may be pivoted to a vertical side position, if desired. The tray assembly 30 is pivotingly affixed to the seat back section 25, and supported by a tray rest arm 42 on the opposite side. The tray assembly 30 may be rotated to a horizontal position where it is to rest upon the stationary tray rest arm 42. The tray assembly 30 may also be rotated to a vertical side position, when desired. The tray assembly 30 is then envisioned to be retained in its vertical position via a tray latch portion 41 of a tray restraint arm 40, also stationarily affixed to a side portion of the seat back section 25 as seen in FIG. 3. A retractable stroller handle 43 complete with at least one (1) cup holder 240 is provided. Finally, a series of four (4) three hundred sixty-degree(360°) rotation pivotable stroller wheels 45 (only three (3) of which are shown due to illustrative limitations) are provided for support and manual locomotion.

The tray assembly 30 is envisioned to include any number of entertaining and educational features such as, but not limited to: a first microphone 31, at least one (1) cup holder 32, at least one (1) audio speaker 48, a removable mirror 50, and a personal electronic device holder 70. The aforementioned features are envisioned to be removably attachable to the tray assembly 30, being installed or removed based upon a user's preferences. The mirror 50 is envisioned to slide into the tray assembly 30, acting as a reflecting mirror when in a vertical position, and as a play or feeding surface when in the horizontal position.

The first microphone 31, speaker 48, and personal electronic device holder 70 are envisioned to be in electrical and electronic communication with each other to provide a multi-functional audio and video system to entertain and educate the child. Furthermore, it is understood that the aforementioned audio/video devices would receive electrical power via sources such as, but not limited to: a battery pack, a solar cell, an AC/DC power source, and the like. An embodiment of the personal electronic device holder 70 is illustrated here including a rectangular cavity 71 formed within a front surface, being particularly sized to snuggly hold a personal electronic device 75 such as an IPHONE®, an IPAD®, or the like within. The personal electronic device holder 70 is envisioned to be secured to the tray assembly 30 using a pair of mounting clips 72, or equivalent method of attachment such as VELCRO®, to position the contained personal electronic device 75 at a convenient viewing position in front of the child.

Figure 5:
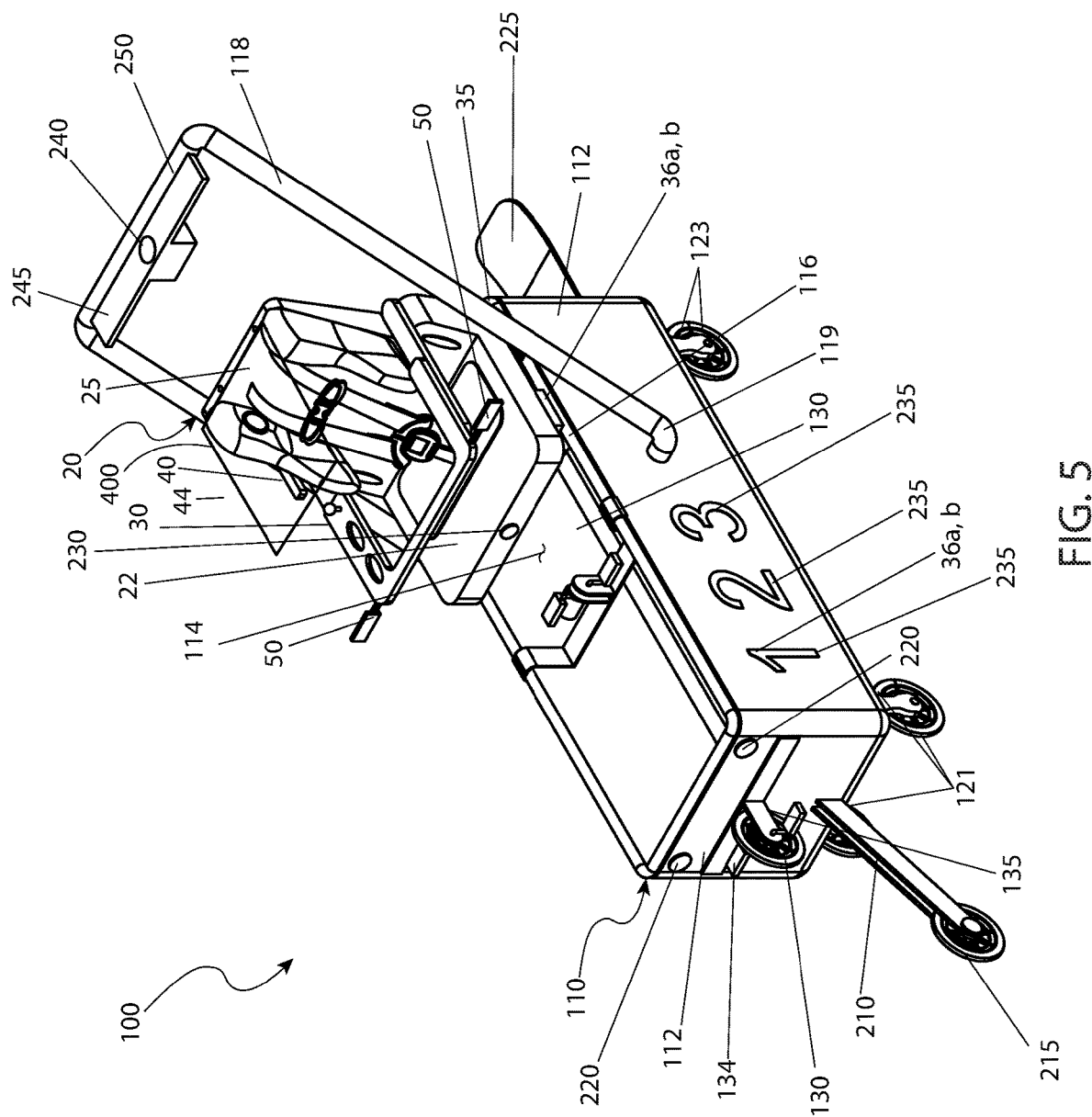
FIG. 5 is a perspective view of the child seat system 10 depicting another stroller embodiment 100, according to a preferred embodiment of the present invention.
Figure 6:
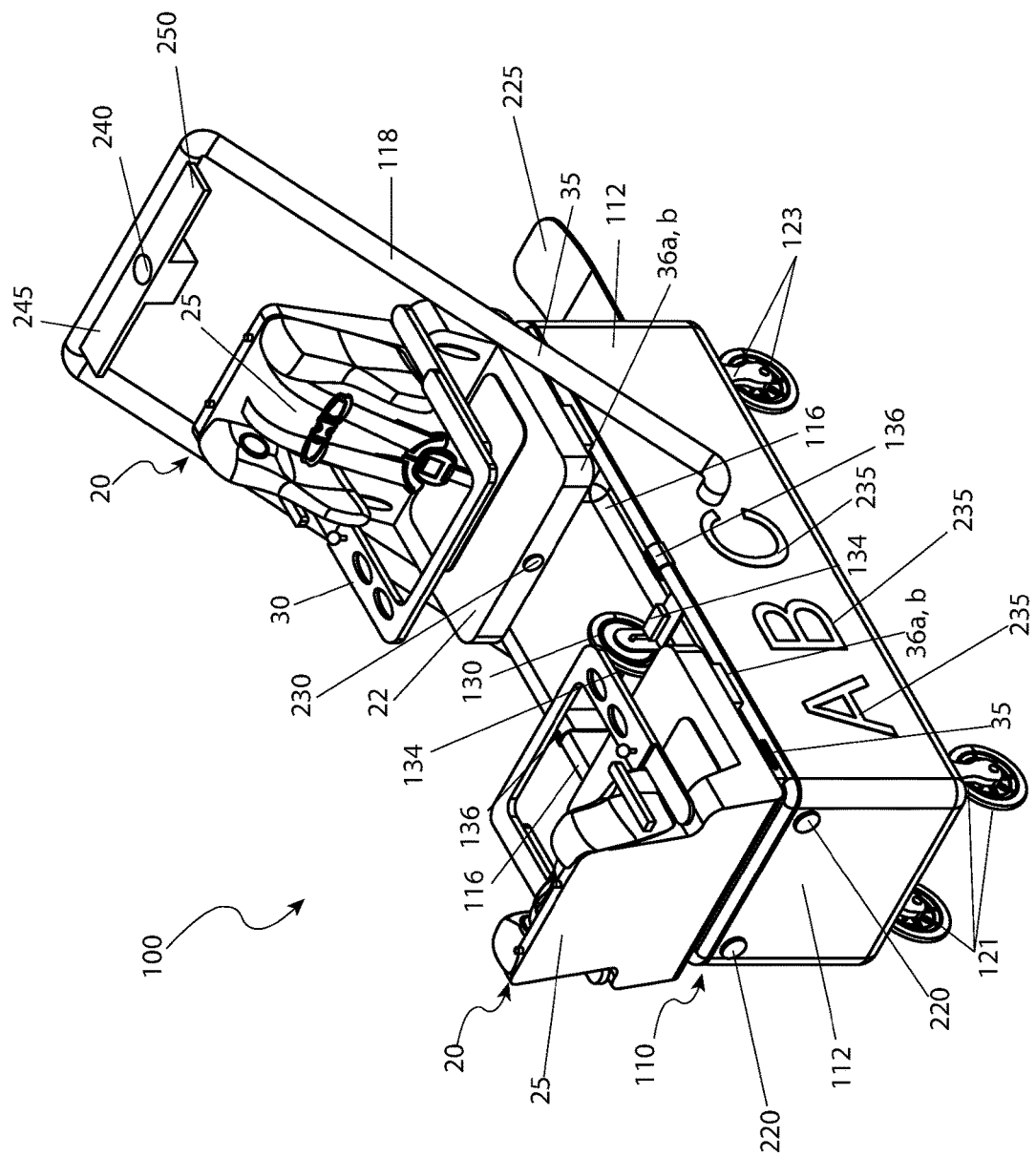
FIG. 6 is another perspective view of the stroller embodiment 100 depicting an alternate seat assembly 20 arrangement, according to a preferred embodiment of the present invention.

The system 10 includes a sunshade 44 which may be installed upon a top edge of the seat back section 25 to provide protection of the occupying child from the sun, being especially beneficial when the system 10 is configured in the stroller embodiment 100 (see FIGS. 5 and 6). The sunshade 44 is envisioned to be constructed using an opaque or semi-transparent framed-in plastic panel or sheet. The embodiment of the sunshade 44 is illustrated here being removably installed upon the seat back section 25 via respective integral portions including post fasteners 46 and sunshade apertures 26; however, it is understood that equivalent methods of temporary attachment may be utilized with equal benefit. The sunshade 44 is envisioned to help block harmful ultraviolet light and reduce incoming sun light, as well as protecting the occupant from rain, wind, or snow. A plurality of solar photovoltaic panels 400 are positioned upon one or both of the sunshades 44 for purposes of capturing the rays of the sun to produce electricity. Said electricity would be utilized in charging the system 10 to allow for operation and extend the useful operation of the system 10 when used outside during daytime hours. Further description of the outrigger arm 210 will be provided herein below.

To further allow use of the system 10 with a wider range of users, the system 10 is provided with a padded infant insert 51. The padded infant insert 51 is envisioned to be manufactured with a soft textile based cover and interior padding. It is placed upon seat section 22 and the seat back section 25 to reduce voids between said surfaces and a small infant. Such features are envisioned to increase safety and enhance comfort. As the child grows the padded infant insert 51 may be removed.

Figure 4:
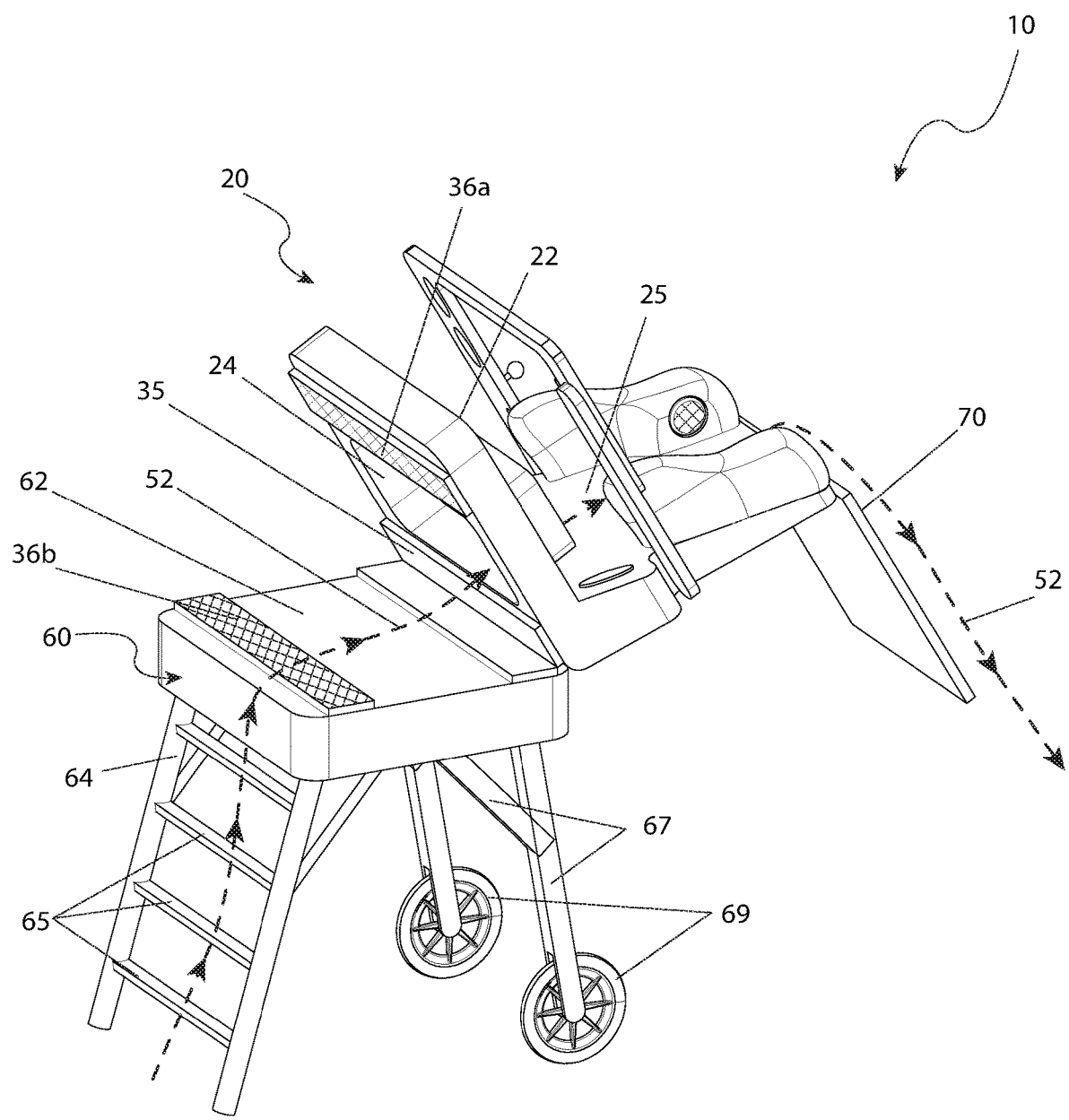
FIG. 4 is a perspective view of the child seat system 10 depicting a climbing activity configuration, according to a preferred embodiment of the present invention.

Referring now to FIG. 4, a perspective view of the system 10 depicting a climbing activity configuration, according to a preferred embodiment of the present invention, is disclosed. The seat assembly 20 and highchair base assembly 60 are depicted here being configured to provide a climbing and crawling activity center for the child. An envisioned climbing path 52 is indicated here illustrating how a child may progress up the ladder frame 64; over the highchair platform 62; through the insert aperture 24; over the seat back section 25, and down an attached ramp 80 to the floor surface. Detachment of the hook 36a and loop 36b fasteners allows the seat assembly 20 to be tilted in a rearward direction about the hinged hook-and-loop fastener 35 to create a tunnel effect as the child progresses through the insert aperture portion 24 of the seat section 22. Additionally, the ramp 80 is envisioned to be attached along one (1) edge to a top edge portion of the seat back section 25 using a hook-and-loop fastener such as VELCRO®, or the like. The ramp 80 is to provide a padded semi-rigid inclined panel having a rectangular shape, forming a gently declining surface upon which the child may safely crawl or slide down.

Referring now to FIGS. 5 and 6, perspective views of the system 10 depicting another stroller embodiment 100, according to a preferred embodiment of the present invention, are disclosed. The stroller base assembly 110 includes an open-top and generally rectangular fabric enclosure 112 supported along upper edges by a tubular frame 116, a pair of pivoting front stroller wheels 121, a pair of fixed rear stroller wheels 123, and an operable pushing handle 118. The enclosure 112 is envisioned to be made using a flexible waterproof fabric material forming an inner space portion 114 below and in between the seat assemblies 20. The pushing handle 118 and wheel portions 121, 123 are to be securely attached to, and supported by the tubular frame 116. The sunshade 44 as aforementioned described is envisioned to help block harmful ultraviolet light and reduce incoming sun light, as well as protecting the occupant from rain, wind, or snow. A plurality of solar photovoltaic panels 400 may be positioned upon the sunshade 44 for purposes of capturing the rays of the sun to produce electricity, as will be described in greater detail herein below.

While in the stroller embodiment 100, the inner space 114 may include a removably attachable pedal assembly 130 having pedals 134 and rotating crank 132 portions to provide an exercising means to the seated child or children, by emulating a cycling activity. The pushing handle 118 is envisioned to be of a metal tubular construction and associated with the frame 116 via a handle pivot portion 119, allowing a caregiver walking behind the apparatus 10 to guide the stroller embodiment 100 along a ground surface. It is further envisioned that the pushing handle 118 would be capable of pivoting from a rearward to a forward position, thereby allowing the caregiver to motion the stroller embodiment 100 in an opposite direction, when desired. It is further envisioned that in another embodiment of the stroller embodiment 100, the pedal assembly 130 may provide a mechanical drive means to the stroller wheels 121,123, thereby enabling the child to pedal the stroller embodiment 100 along a surface while being coincidentally motioned by the caregiver using the pushing handle 118. The attachable pedal assembly would be provided for both seat assemblies 20 while in a forward-facing position. The distal seat (forward position) is also provided with an outrigger arm 210 and a pivotable wheel 215 to aid in steering of the stroller embodiment 100. Each of the seat assembly 20 is provided with an attachable mirror 50 as shown to allow the child to see the parent or care provider located near the pushing handle 118 for reassurance and comfort. The front of each seat assembly 20 is also provided with a release button 230 to aid in release, rotation, and/or removal of said respective seat assembly 20. The forward-facing surface of the stroller base assembly 110 is provided with two (2) headlight assemblies 220 to aid in operation during nighttime hours or other periods of reduced ambient light. The rear facing surface of the stroller base assembly 110 is provided with a centrally located outrigger standing board 225 to permit older children to stand upon during motion of the stroller base assembly 110. The outrigger standing board 225 is only partially shown due to illustrative limitations. The side facing surfaces of the stroller base assembly 110 are provided with a plurality of decorative icons 235 such as numeric characters (as shown in FIG. 5), alpha characters (as shown in FIG. 6), geometric shapes, figurines, or the like. Said decorative icons 235 are physically attached by a retractable cable (not shown) to allow the child to pull on the decorative icons 235 for purposes of play.

When released by the child, the decorative icons 235 will retract automatically to a stowed position as shown. Now concentrating on the upper portion of the pushing handle 118, a cup holder 240, a GPS tracking device 245, and a Wi-Fi hotspot 250 are shown. The cup holder 240 would be used for the common application of holding a cup, insulated flask, water bottle, beverage bottle or the like for purposes of providing liquid refreshment for the child, parent or care provider during use of the stroller base assembly 110. The GPS tracking device 245 receives coordinate information from the GPS satellite array and determines the location of the stroller base assembly 110 to within several feet anywhere on the face of the earth. Said location information is then transferred to the Wi-Fi hotspot 250 which relays the subject location information along with related unique identifiers for broadcast to local cellular networks and subsequent placement within a database located in a cloud-based (internet) computing platform. This permits authorized users of the platform (those with provided login and password information) the ability to log in via software or web-based applications on their personal computer (PC), tablet computer, smart phone, or related device, to determine the location of the stroller base assembly 110 on a real-time basis. Such information is viewed as being useful in location of spouses, paid workers (baby sitters) or in the event of theft or kidnapping. The Wi-Fi hotspot 250 also provides internet connectivity to devices (such as tablet computers) that do not have internal cellular (GSM) based transceivers and are only equipped with Wi-Fi type transceivers. Such internet based connectivity is viewed as especially useful when on trips away from home, to local parks, or when simply taking children for a ride in the stroller base assembly 110.

In a similar manner, FIG. 6 depicts the distal seat assembly 20 rotated one hundred eighty degrees(180°) so that both seat assembly 20 are facing one (1) another. Likewise, FIG. 6, also discloses the headlight assemblies 220, the outrigger standing board 225, the release button 230, the decorative icons 235, the cup holder 240, the GPS tracking device 245, and the Wi-Fi hotspot 250.

Figure 7:
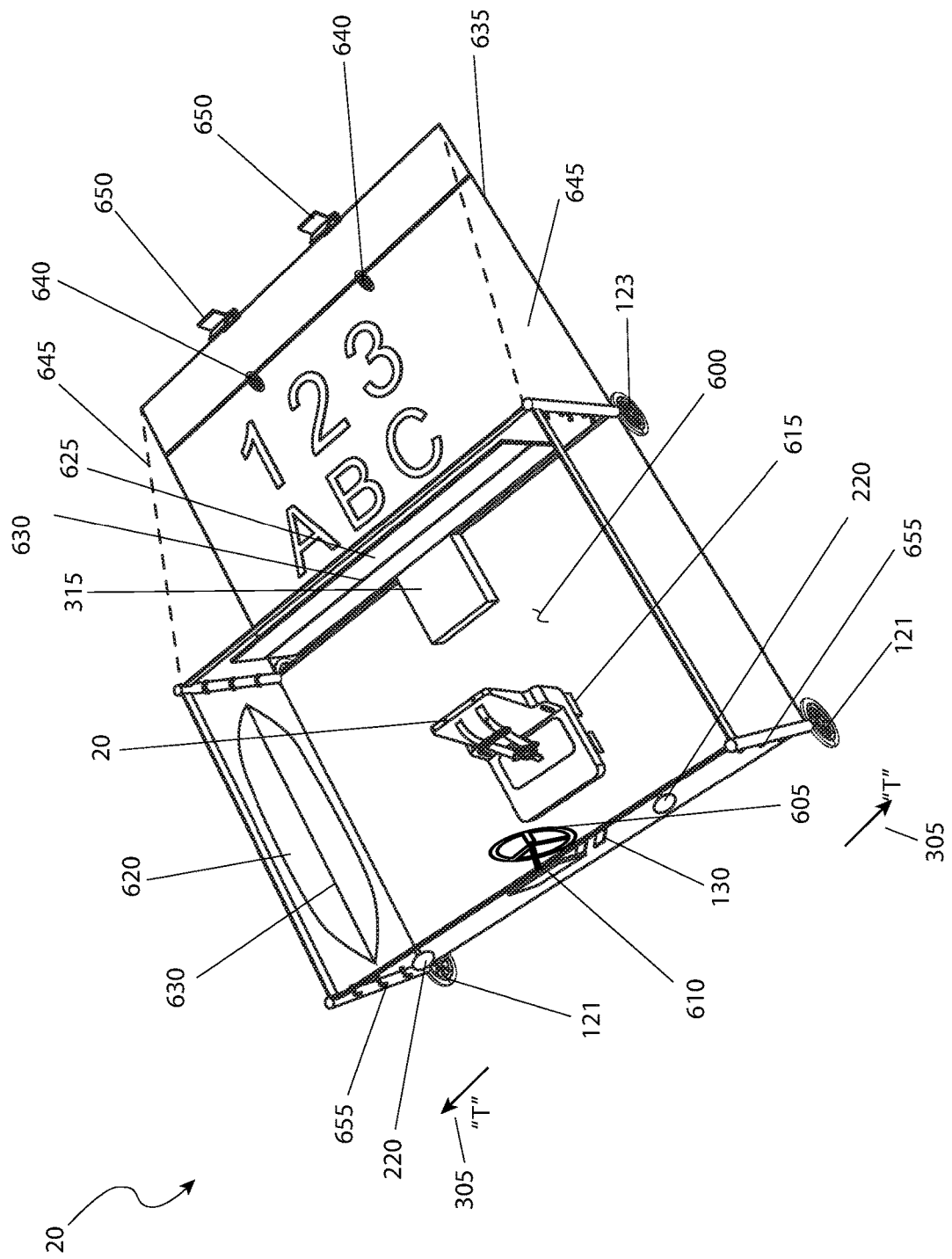
FIG. 7 is a perspective view of the playpen embodiment 300, depicting an alternate use of the child seat system 10, according to a preferred embodiment of the present invention.
Figures 8A, 8B:
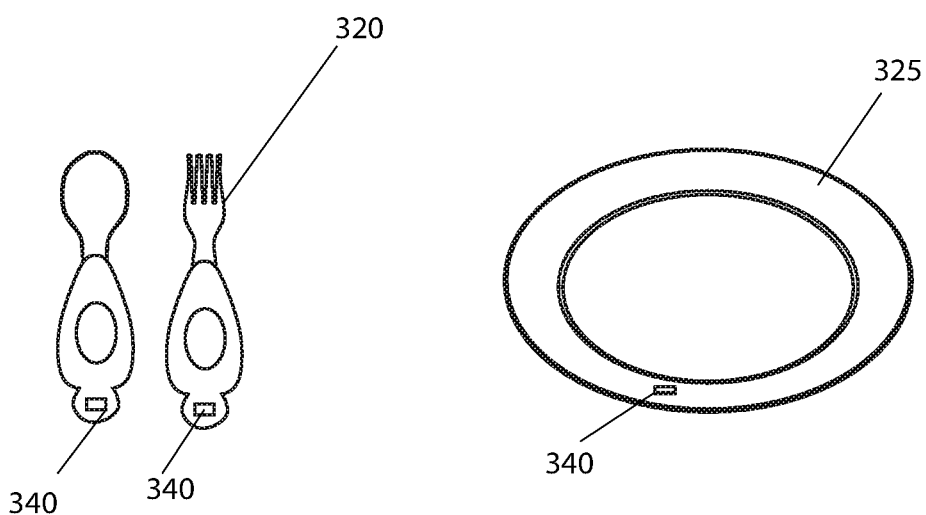
FIG. 8a is a perspective diagram of a spoon and fork set 320 as utilized with the child seat system 10, according to a preferred embodiment of the present invention.
FIG. 8b is a perspective diagram of a plate 325 as utilized with the child seat system 10, according to a preferred embodiment of the present invention.
Figures 8C, 8D:
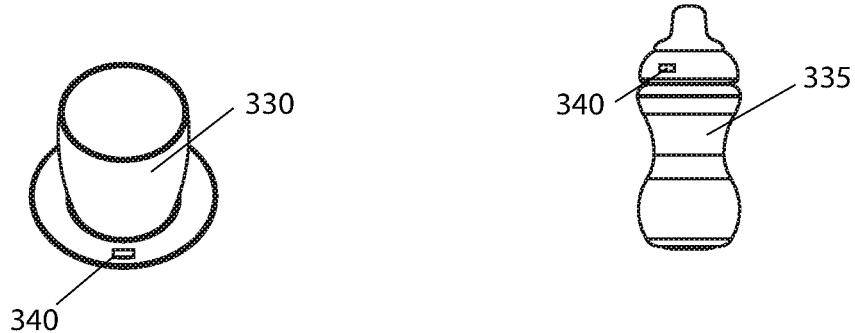
FIG. 8c is a perspective diagram of a cup 330 as utilized with the child seat system 10, according to a preferred embodiment of the present invention.
FIG. 8d is a perspective diagram of a sippy-style cup 335 as utilized with the child seat system 10, according to a preferred embodiment of the present invention.

Referring next to FIG. 7, a perspective view of the playpen embodiment 300, depicting an alternate use of the child seat system 10, according to a preferred embodiment of the present invention is shown. The two (2) long sides of the stroller base assembly 110 pull out along a travel path "t" 305, to provide an open play space 310 once both seat assembly 20 (as shown in FIG. 5 and FIG. 6) are removed. Such an arrangement provided by the open play space 310 provides children the ability to play outside in a semi protected environment such as colder temperatures, wet play surfaces, or the like. The open configuration of the playpen embodiment 300 also discloses a drive mechanism enclosure 315 containing batteries, motors, gear drive/reduction units and other well-known electromechanical devices used to aid in the propulsion of the stroller base assembly 110 (as shown in FIG. 5 and FIG. 6. Further description of the drive mechanism enclosure 315 will be provided herein below. FIG. 7 also discloses a double-sided trampoline 600 upon which children may jump. An additional pedal assembly 130 works in conjunction with a steering wheel 605 and a 3D driving monitor 610 to allow for implementation of virtual driving games by the child(ren). A series of seat snap-in clips 615 are used to hold a seat assembly 20 to serve as a driver's seat. An oval storage compartment 620 and a square storage compartment 625 are provided with a zipper 630 for storage of items such as toys, supplies, food, or the like. An activity play mat 635 is provided on the rear of the playpen activity and is supported by auxiliary support wheels 640 and support chains 645. When not in use, the activity play mat 635 is held in contact with the play pen assembly via at least two (2) attachment clamps 650. The front of the playpen assembly also provides speaker strips 655 and headlight assemblies 220.

Referring now to FIGS. 8a-8d, a perspective diagram of an eating utensil set 200 as utilized with the child seat system 10, according to a preferred embodiment of the present invention is disclosed. The eating utensil set 200 is envisioned to be a spoon and fork set 320, a plate 325, a cup 330, and a sippy cup 335. Each item of the eating utensil set 200 is envisioned to contain a text-to-speech conversion circuit 340 which will emit various phrases during use. Such phrases are envisioned to encourage the child to eat, such as "eat up", "good job", "let's finish your food" and the like. It is envisioned that the eating utensil set 200 would be utilized with the high chair platform 62 (as shown in FIG. 1) although it may be used separately as well, and as such, the included or excluded use should not be interpreted as a limiting factor of the present invention. Transmission of said sound segments will be provided will be provided herein below.

Figure 9:
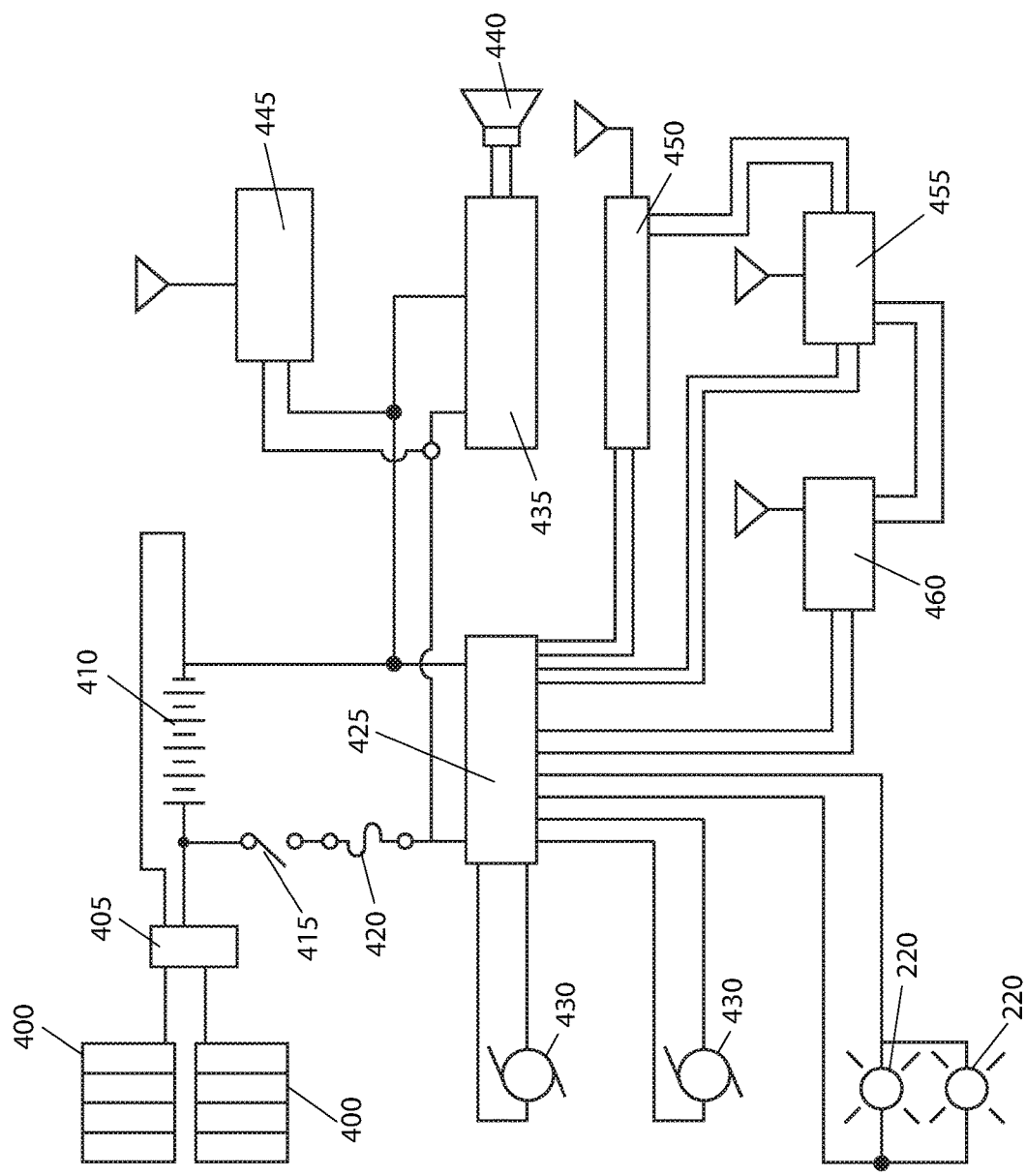
FIG. 9 is an electrical block diagram depicting the major components of the child seat system 10, according to a preferred embodiment of the present invention.

Referring next to FIG. 9, an electrical block diagram depicting the major components of the child seat system 10, according to a preferred embodiment of the present invention is depicted. Electrical power for the child seat system 10 is provided from two (2) speech speaker 440 (as also shown in FIG. 2) which is routed through a charge controller 405. Output from the charge controller 405 is then electrically connected to a rechargeable battery bank 410. An ON/OFF switch 415 controls overall operation of the child seat system 10 and prevents unauthorized use. A rechargeable battery bank 410 such as a fuse or circuit breaker provides protection against overcurrent conditions. Power is then routed to a main controller 425 which provides control over all electrical devices associated with the child seat system 10. Two (2) outputs are provided to drive motors 430 as well as the headlight assemblies 220. Next, power is routed to a speech control circuit 435 and a subsequent speech speaker 440 as used with the eating utensil set 200 (as shown in FIG. 8). Activation of the speech control circuit 435 is controlled by a speech receiver 445 which receives RF transmissions from the text-to-speech conversion circuit 340 (as shown in FIG. 8). In a continued process, electrical power is applied to a GPS receiver 450 which receives coordinates from the conventional Global Positioning Satellite (GPS) array. As aforementioned described, said coordinates are then transferred to a Wi-Fi transceiver circuitry 455 which parses the data into an acceptable format for storage in internet cloud-based storage system. Finally, Wi-Fi data (including location information as well as local traffic originating from handheld devices, tablet computers, and the like) is passed to a backhaul transmitter 460, such as a cellular based transmitter, which provides long-range, higher power RF signals to connect to existing data and/or telephony circuits.

Figure 10:
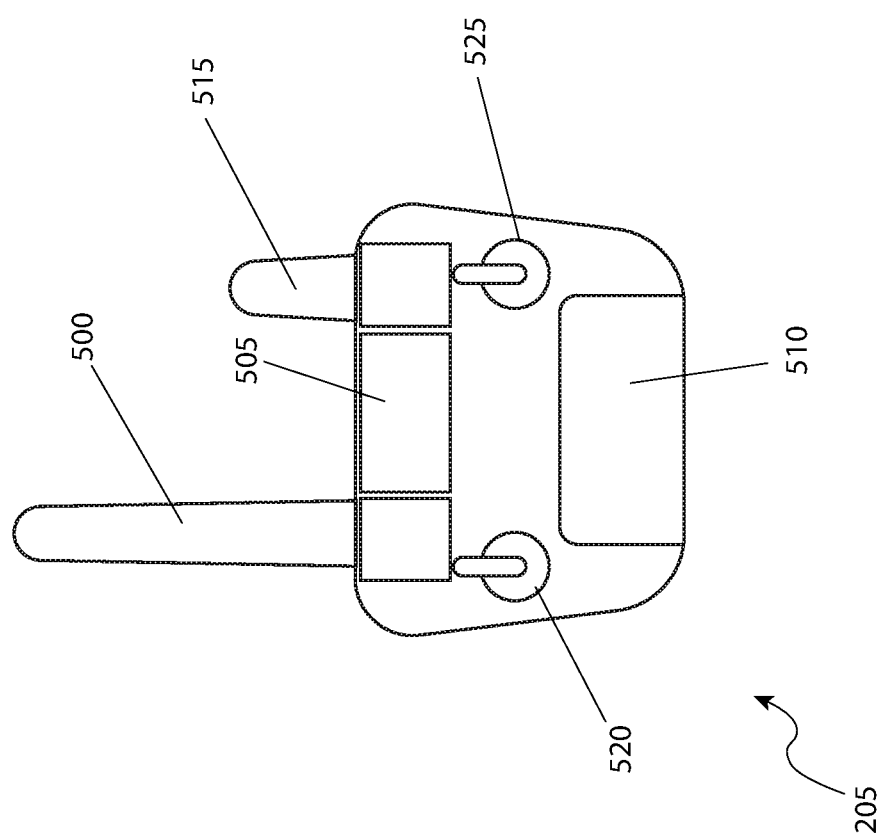
FIG. 10 is a perspective diagram of a remote-control device 205 as utilized with the child car seat system 10, according to a preferred embodiment of the present invention.

Referring now to FIG. 10, a perspective diagram of a remote-control device 205 as utilized with the child car seat system 10, according to a preferred embodiment of the present invention is shown. The remote-control device 205 is provided to allow for remote control over the propulsion features of the stroller base assembly 110, and operates similar in manner to that of a remote control for a toy car. The remote-control device 205 is provided with its own GPS receiver (internal to the remote-control device 205) and is thus provided with a GPS antenna 500 and a GPS notification screen 505. A navigation computer 510 is also provided for purposes of planning walking routes, quickest path home, total amount of walking covered in a session or multiple sessions, or the like. Operation of the navigation computer 510 would be similar to those found on smart phones or installed on later model automobiles. A Wi-Fi antenna 515 is then provided for purposes of relaying telemetry between the remote-control device 205 and the Wi-Fi transceiver circuitry 455 (or Wi-Fi hotspot 250) as shown in FIG. 9. Such telemetry allows for the mechanical control of the child seat system 10 in conjunction with a speed controller 520 and a gear selection controller 525, both of which operate in an "advance-forward", "retreat-backward" control of motion method. In an alternate embodiment, the functionality of the remote-control device 205 can be provided by a smart phone running a dedicated app (application) whose telemetry control is passed to the child seat system 10 via Wi-Fi signals.

Figure 11:
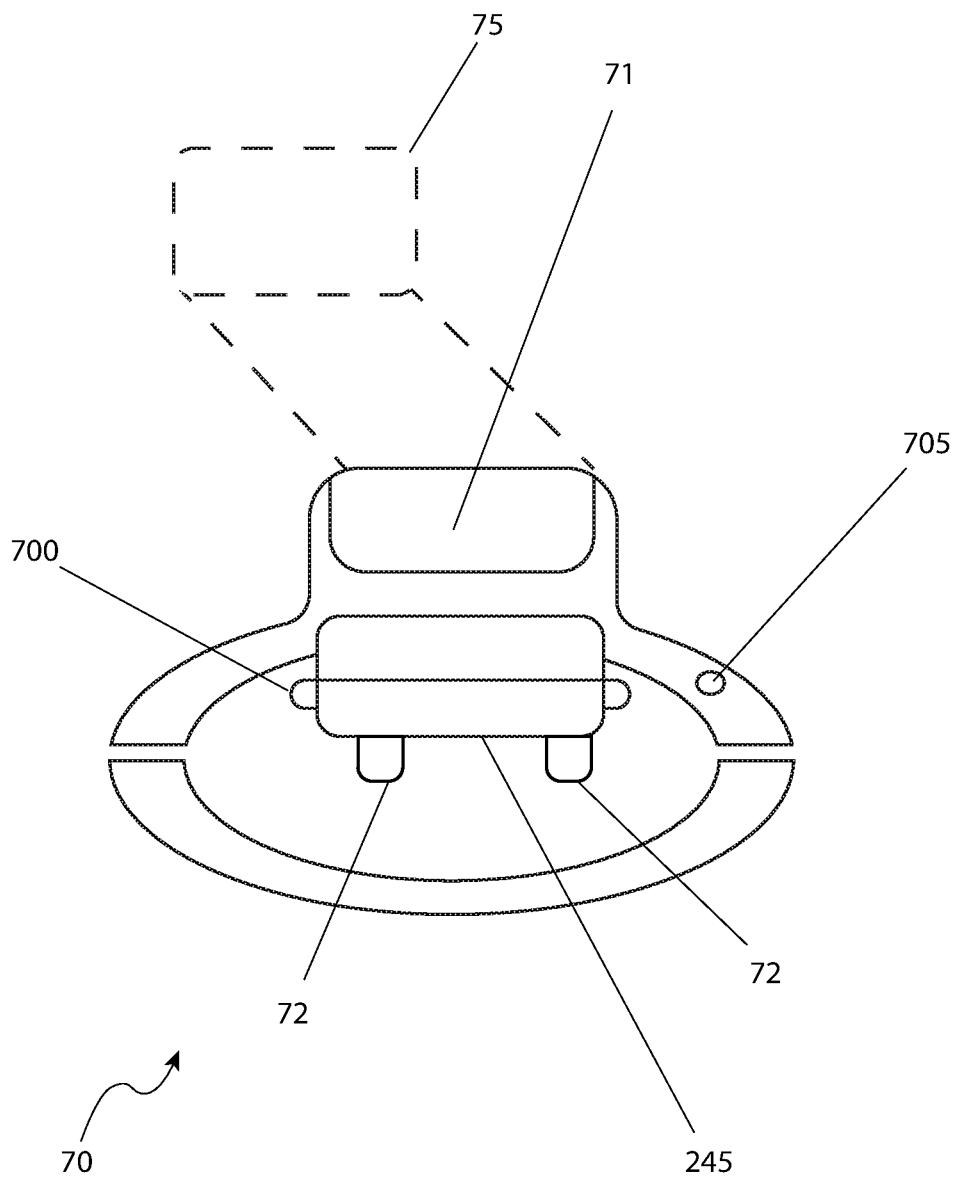
FIG. 11 is a front view of the gear style personal electronic device holder 70 as utilized with the child car seat system 10, according to a preferred embodiment of the present invention; and, FIG. 12 is a perspective view of the child car seat system 10, utilizing a car seat base 715 atop the playpen embodiment 300, according to a preferred embodiment of the present invention.

Referring next to FIG. 11, a front view of the gear style personal electronic device holder 70 as utilized with the child car seat system 10, according to a preferred embodiment of the present invention is depicted. The gear style personal electronic device holder 70 mimics the appearance of a "GEAR STYLE". It contains provides for an audio plug 700 which connects to a GPS tracking device 245 (if thus provided and equipped). The specific GPS tracking device 245 if provided would include but be not limited to: Wi-Fi connections, 64 GB storage, and a GPS tracking system. A second microphone 705 is also provided for purposes of user interface to the GPS tracking device 245. Finally, the gear style personal electronic device holder 70 provides the ability to hold a tablet computer in a table holder 710.

Figure 12:
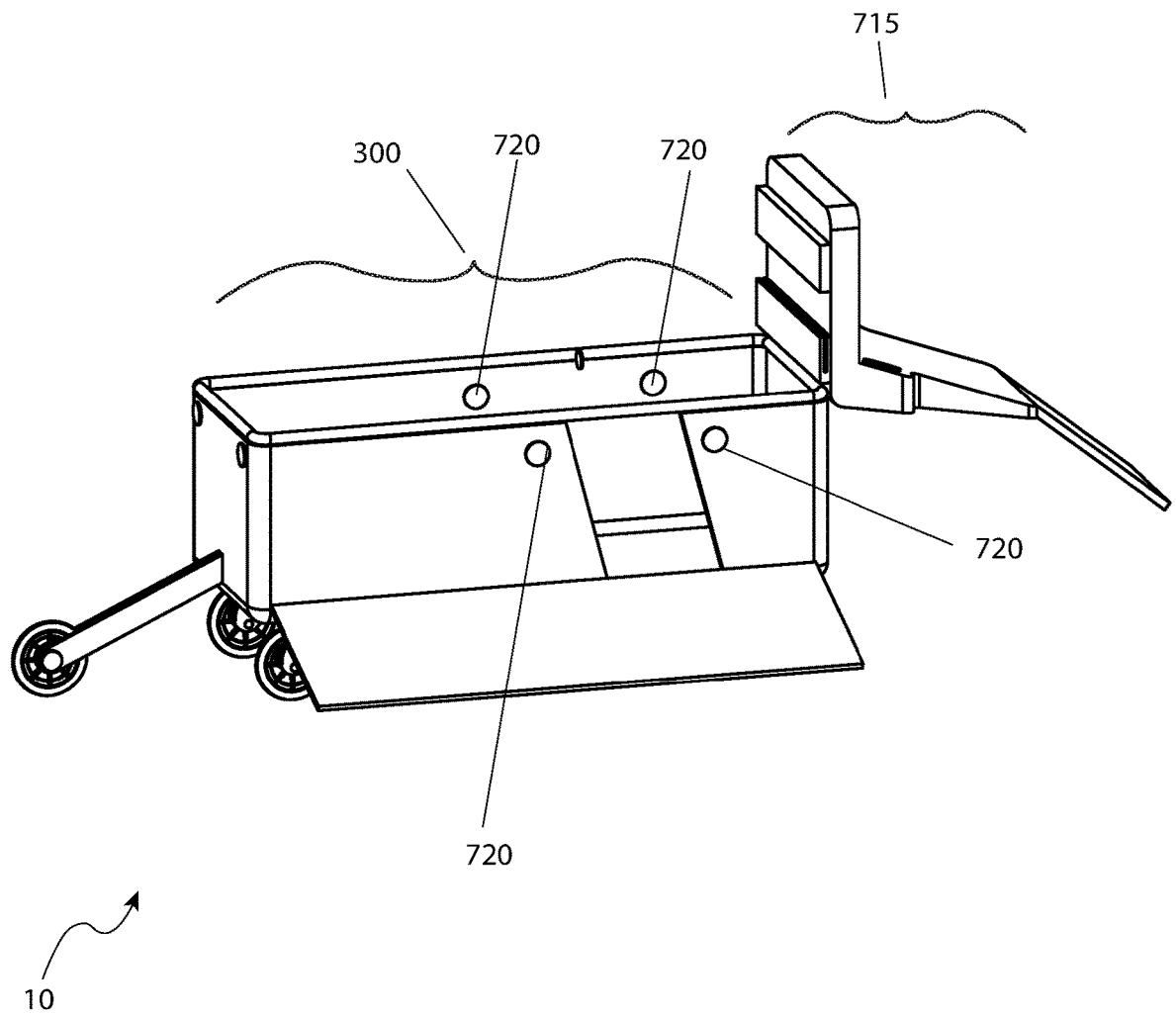

Referring finally to FIG. 12, a perspective view of the child car seat system 10, utilizing a car seat base 715 atop the playpen embodiment 300, according to a preferred embodiment of the present invention is disclosed. The car seat base 715 may be used in lieu of the high chair platform 62 (as shown in FIG. 1) although it may be used separately as well, and as such, the included or excluded use should not be interpreted as a limiting factor of the present invention. The car seat base 715 is connected to the distal end of the playpen embodiment 300. A series of four (4) adjustable handles 720 are provided to convert the child car seat system 10 to and from the various embodiments presented herein.

It is envisioned that other styles and configurations of the present invention can be easily incorporated into the teachings of the present invention, and only one (1) particular configuration shall be shown and described for purposes of clarity and disclosure and not by way of limitation of scope.

2. Operation of the Preferred Embodiment

The preferred embodiment of the present invention can be utilized by the common user in a simple and effortless manner with little or no training. After initial purchase or acquisition of the system 10, it would be configured into various embodiments as indicated in FIGS. 1, 4, 5, and 6.

Following procurement of a model of the system 10 having a desired external appearance and number of seat assemblies 20, the method of configuring and utilizing the system 10 as a stand-alone car seat may be achieved by performing the following steps: placing a seat assembly 20 upon an existing vehicle seat; pivoting the tray assembly 30 up to its vertical position and securing it there using the tray latch 41; adjusting the booster seat 23 into a desired height into the seat aperture portion 24 of the seat section 22; placing the child into the seat assembly 20; routing an existing seatbelt portion of the vehicle through the seat belt apertures 38; buckling the existing vehicle seat belt around the child in a normal manner; connecting the shoulder straps 27a and crotch strap 27b together using the buckle 28; utilizing the entertaining and educational features of the tray assembly 30 with the tray assembly in its vertical position, or releasing the tray assembly 30 from the tray latch 41 and pivoting the tray assembly 30 downward until contacting the tray rest arm 42, if desired; utilizing the first microphone 31, cup holders 32, audio speakers 48, the mirror 50, and the personal electronic device holder 70 to hold a personal electronic device 75 as desired; and, benefiting from an entertaining and educational vehicle car seat assembly 20 afforded a user of the present invention 10.

The method of configuring and utilizing the system 10 as a highchair may be achieved by performing the following steps: placing the highchair base assembly 60 upon a flat surface; placing the seat assembly 20 upon the highchair platform 62; securing the seat assembly 20 to the highchair platform 62 using the hook and loop fastener portions 35, 36a, 36b; pivoting the tray assembly 30 up to its vertical position and securing it there using the tray latch 41; adjusting a booster seat 23 to a desired height into the seat aperture portion 24 of the seat section 22; placing the child into the seat assembly 20; connecting the shoulder straps 27a and crotch strap 27b together using the buckle 28; inserting the mirror 50 into the tray assembly 30, if not previously installed; releasing the tray assembly 30 from the tray latch 41 and pivoting the tray assembly 30 downward until contacting the tray rest arm 42; utilizing the rear surface of the mirror 50 for playing or feeding the child; and, utilizing the other features of the tray assembly 30 as previously described.

The method of configuring and utilizing the system 10 as a climbing activity may be achieved by performing the following steps: configuring the system 10 in the highchair embodiment; releasing the flat hook 36a and loop 36b fasteners; tilting the seat assembly 20 about the hinged hook-and-loop fastener 35 in a rearward direction; removing the booster seat 23 if not previously removed; fastening the proximal end of the ramp 70 to the seat back section 25; positioning the distal portion of the ramp 80 upon a floor surface; guiding and encouraging the child to proceed up the ladder frame 64, over the highchair platform 62, through the insert aperture 24, over the seat back section 25, and down the ramp 80 to the floor surface; and, benefiting from an entertaining form of exercising.

The method of configuring and utilizing the system 10 as a playpen activity may be achieved by performing the following steps: configuring the system 10 in the playpen embodiment; removing one (1) or both seat assembly 20 by use of activation of the release button 230; extending side members of the stroller base assembly 110 in an outward manner as described by the travel path "t" 305; and, benefiting from an entertaining form of amusement/entertainment for the child(ren).

The method of configuring and utilizing the system 10 in the stroller embodiment 100 may be achieved by performing the following steps: mounting one (1) or two (2) seat assemblies 20, facing in desired directions, onto the tubular frame portions 116 of the enclosure portion 112 of the stroller base assembly 110 by utilizing the flat hook fasteners 36a, the flat loop fasteners 36b, and the hinged hook-and-loop fasteners 35; inserting the pedal assembly 130 into the inner space portion 114 of the enclosure 112, if desired; adjusting booster seat 23 to desired height, into the seat aperture portions 24 of the seat sections 22; loading and securing the child or children as previously described for the highchair configuration; installing the sunshade 44 to protect the child or children from the sun and/or the elements by inserting the post fasteners 46 into the shade apertures portions 26 of the seat back section 25; allowing a caregiver to grasp and position the pushing handle 118 in a desired direction and attitude; allowing the caregiver to push the stroller embodiment 100 in a normal manner; and, encouraging the child or children to utilize the features of the tray assembly 30, and/or use the pedal assembly 130 to emulate a cycling activity. Propulsion of the stroller embodiment 100 can be controlled in a manual manner using the pushing handle 118 or by use of the remote-control device 205 to control the drive motors 430 through the main controller 425. Navigation of the stroller embodiment 100 can be enhanced by use of the GPS receiver 450, the Wi-Fi transceiver circuitry 455, the backhaul transmitter 460, and the navigation computer 510. Should operation of the stroller embodiment 100 occur in reduced ambient lighting, the headlight assemblies 220 can be activated through the navigation computer 510.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A child seat system, comprising:
   a seat assembly comprising:
   a pivoting tray assembly;
   at least one child restraining strap;
   a booster seat;
   a pair of side inserts; and,
   a pair of vehicle seatbelt apertures;
   wherein said seat assembly includes an L-shaped structure having a conjoined rectangular seat section and a seat back section portions;
   wherein said seat assembly is removable completely from a highchair base assembly by detaching at least one fastener;
   wherein said pair of side inserts are removable;
   wherein said seat assembly provides a plurality of sitting heights via a booster seat capable of height adjustment;
   wherein said booster seat is sized to fit securely within a rectangular seat aperture portion formed within a center portion of said seat section;
   wherein said seat assembly is usable in a stand-alone manner as a car seat device by utilizing a shoulder and crotch strap portion and by routing an existing vehicle seatbelt through a pair of seatbelt apertures formed through opposing side portions of said seat assembly;
   wherein said tray assembly is positioned horizontally across a front area of said child, and is pivotal to a vertical side position;
   wherein said tray assembly is pivotably affixed to said seat back section, and supported by a tray rest arm on an opposite side;
   wherein, said tray assembly is rotatable to a horizontal position where it is to rest upon said tray rest arm;
   wherein, said tray assembly is also rotatable to a vertical side position, said tray assembly is retained in said vertical side position via a tray latch portion of a tray restraint arm, said tray restraint arm stationarily affixed to a side portion of said seat back section;
   a highchair base assembly comprising:
   a step-ladder-shaped structure having a horizontal highchair platform along a top portion;
   a plurality of protruding frame members which extend downwardly to support a ladder frame along a front edge;
   a pair of highchair wheels along a rear edge portion of said highchair platform,
   wherein said pair of highchair wheels are rearwardly located and enable easy transport of said highchair base assembly across a surface;
   a plurality of protruding frame members which extend downwardly to support a ladder frame along a front edge; and,
   wherein said seat assembly is removably affixed along a top surface of said highchair base assembly;
   wherein said highchair platform is envisioned to provide a rigid bottom surface and a padded top surface; and,
   wherein said ladder frame includes a plurality of integral horizontal and parallel rungs, acting to provide a climbing activity for said child.

2. The child seat system according to claim 1, wherein said conjoined rectangular seat section and said seat back section portions comprise foam rubber sections with waterproof vinyl coverings.

3. The child seat system according to claim 1, wherein said seat assembly is removable completely from said highchair base assembly by detaching at least one fastener or said seat assembly is pivoted rearwardly about a hinged hook-and-loop fastener by detaching only a front hook and loop fastener portion to configure said child seat system for climbing activity.

4. The child seat system according to claim 1, wherein said seat assembly is removably affixed to said highchair platform portion along a front edge portion via integral corresponding flat hook fastener and flat loop fastener portions and along a rear edge portion via a hinged hook-and-loop fastener.

5. The child seat system according to claim 1, wherein said tray assembly further comprises:
   a first microphone;
   at least one cup holder;
   at least one audio speaker;
   a removable mirror; and,
   a personal electronic device holder;
   wherein said first microphone, said speaker, and said personal electronic device holder are in electrical and electronic communication with each other to provide a multi-functional audio and video system.

6. The child seat system according to claim 5, wherein said mirror slides into said tray assembly, acting as a reflecting mirror when in a vertical position, and as a play or feeding surface when in a horizontal position.

7. The child seat system according to claim 1, wherein a plurality of four 360 degree rotation pivotable stroller wheels are provided for support and manual locomotion that are configured to replace said pair of highchair wheels and said ladder frame.

8. The child seat system according to claim 1, further comprising an eating utensil set including a spoon and fork set, a plate, a cup, and a sippy cup;
   wherein said spoon and fork set, said plate, said cup, and said sippy cup each have a text-to-speech conversion circuit.

9. A child seat system, comprising:
   a stroller base assembly comprising:
   an open-top and generally rectangular fabric enclosure supported along upper edges by a tubular frame;
   a pair of pivoting front stroller wheels;
   a pair of fixed rear stroller wheels; and,
   an operable pushing handle;
   wherein said enclosure comprises a flexible waterproof fabric material forming an inner space portion below and in between a pair of seat assemblies;
   wherein said seat assemblies rotate 180 degrees so that both seat assemblies are facing one another;
   wherein a front of each seat assembly is also provided with a release button to aid in release, rotation, and removal of said respective seat assembly;

wherein said pushing handle and said wheel portions are securely attached to, and supported by the tubular frame;

wherein a sunshade is envisioned to help block harmful ultraviolet light and reduce incoming sun light, as well as protect an occupant from rain, wind, or snow;

wherein a plurality of solar photovoltaic panels is positioned upon said sunshade for purposes of capturing sun rays to produce electricity;

wherein said pushing handle is of a metal tubular construction and associated with said frame via a handle pivot portion;

wherein said pushing handle is capable of pivoting from a rearward to a forward position, thereby allowing a caregiver to move said child seat system in an opposite direction, allowing said caregiver walking behind said child seat system to guide said child seat system along a ground surface; and, wherein said inner space comprises a removably attachable pedal assembly having at least two pedals and rotating crank portions to provide an exercising means.

10. The child seat system according to claim 9, wherein said pedal assembly provides a mechanical drive means to said stroller wheels, thereby enabling said child to pedal said child seat system along a surface while being coincidentally motioned by a caregiver using said pushing handle.

11. The child seat system according to claim 9, wherein said removably attachable pedal assembly is provided for each of said seat assemblies while in a forward-facing position, said forward-facing position is also provided with an outrigger arm and a pivotable wheel to aid in steering of said child seat system.

12. The child seat system according to claim 9, wherein each of said seat assembles is provided with an attachable mirror to allow said child to see said care provider located adjacent said pushing handle.

13. The child seat system according to claim 9, wherein a forward-facing surface of said stroller base assembly is provided with two headlight assemblies.

14. The child seat system according to claim 9, wherein a rear facing surface of said stroller base assembly is provided with a centrally located outrigger standing board to permit said child to stand upon during motion of said stroller base assembly.

15. The child seat system according to claim 9, wherein said side facing surfaces of said stroller base assembly are provided with a plurality of decorative icons and are each individually physically secured to a retractable cable to allow said child to pull on each said decorative icon.

16. The child seat system according to claim 9, wherein an upper portion of said pushing handle comprises a cup holder, a GPS tracking device, and a Wi-Fi hotspot.

17. The child seat system according to claim 9, further comprising an eating utensil set comprising a spoon and fork set, a plate, a cup, and a sippy cup, wherein said spoon and fork set, said plate, said cup, and said sippy cup each have a text-to-speech conversion circuit.

18. The child seat system according to claim 9, further comprising a personal electronic device holder that provides for an audio plug which connects to said GPS tracking device.

19. The child seat system according to claim 9, further comprising a remote-control device provided to allow for remote control over a propulsion feature of said stroller base assembly;

wherein said remote-control device comprises a GPS receiver having a GPS antenna, a GPS notification screen and a navigation computer.

20. The child seat system according to claim 9, further comprising a car seat base atop a playpen.

* * * * *